UNITED STATES PATENT OFFICE 2,375,258

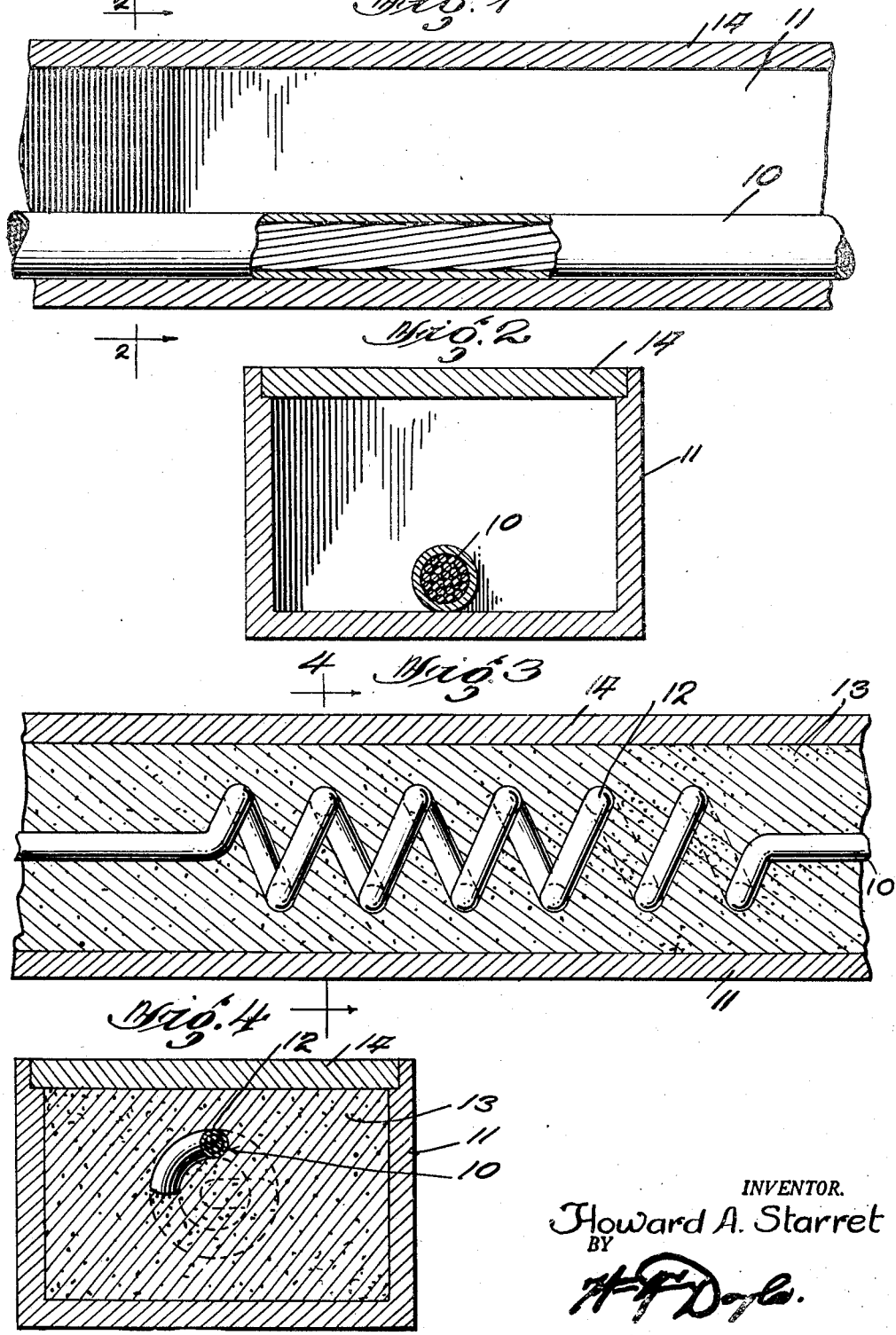

POWER LINE

Howard A. Starret, United States Army

Application October 18, 1941, Serial No. 415,583

1 Claim. (Cl. 174—96)

(Granted under the act of March 3, 1883, as amended April 30, 1928; 370 O. G. 757)

The invention described herein, if patented, may be manufactured and used by or for the Government for governmental purposes without the payment of any royalty thereon.

This invention relates to means for reducing, shattering, breaking or otherwise rendering ineffective for the purpose for which they were designed, wires, power lines and other accessories, such as insulators, connectors and their accessories through detonations occurring in their vicinity.

Observations on the effect of detonation on the breakage of power or communication cable have shown the necessity for new principles in the installation of cable if serious damage is to be avoided.

The interruption of power and communication service through breakage of cable has had serious complications under actual war-time conditions.

Records of the ground motion following detonation can be analyzed into two separate phases: 1. High-frequency vibrations of short duration and amplitude. 2. A slow movement of the ground over a considerable period of time, i. e., of the order of 0.1 second, which may result in extension of some distance finally.

This latter state of the ground motion is similar in its various aspects to that encountered in earthquakes. Types of construction which would reduce the damage arising in earthquakes would be equally valuable in this connection.

My novel method is that of laying the wiring loose in wide conduit. Any extension can be taken up in the slack in the wiring. If the conduit is made of such material that it does not crack or rupture in such a manner that it can sever the wiring or cable then such a construction would give satisfactory results.

Laying cable loose in gas iron piping would be unsatisfactory since the piping is very liable to crack in such a manner that the cable is sheared off. It has been found that wood, concrete and other materials would be more satisfactory.

The wiring can also be inclosed in a receptacle which is filled with loose sand or other vibration-resisting material.

Therefore it is an object of this invention to provide a power line that will withstand the shocks of detonations from bombs or high explosive shells which are comparable with the shocks that are encountered during earthquakes.

Further advantages and objects of the invention will appear in the following detailed description taken in connection with the accompanying drawing in which:

Fig. 1 is a fragmentary, horizontal section in the power line showing the cable partly in section.

Fig. 2 is a sectional view on line 2—2 of Fig. 1.

Fig. 3 is a fragmentary section through the power line showing the cable in coiled position.

Fig. 4 is a sectional view on line 4—4 of Fig. 3.

Reference now being made to the drawings by numeral, 10 indicates the power line which, as shown in Fig. 1, is laid in receptacle 11 which can be made of wood, concrete or other materials that will satisfactorily withstand pressure and shock.

In Fig. 3 there is shown the power line 10 having interposed therein at stated points along its length helical convolutions or coils 12 which are provided to absorb shock and at the same time permit the power line to contract and expand without the danger of breakage or disconnection.

In this particular arrangement the receptacle 11 surrounding the power line is filled with fine loose dry sand 13 which is used as a further means to absorb shock from detonations as well as earthquakes. The receptacle 11 is provided with a removable lid 14 which permits access to the line in case the line is broken by a direct hit from a bomb or a high explosive shell or an earthquake.

The purpose and operation of the invention will be obvious to those skilled in the art and it will also be understood that various changes may be made in this invention without departing from the spirit thereof and therefore it is not to be understood as limited to what is shown in the drawing and described in the specification since these may be modified within the scope of the appended claim without departing from the spirit and scope of the invention.

Having thus described the invention, what is claimed as new and desired to obtain by Letters Patent is:

A power line for underground installation comprising a heavy cable formed of a plurality of strands twisted together and inclosed in a tubular metallic sheath, and having integral sections at spaced intervals twisted and bent into a plurality of helical turns, and a conduit consisting of a box-like casing made of material of insufficient rigidity and strength to sever the cable if fractured and displaced by ground movement, the space between the cable and the conduit being filled with loose sand whereby the cable is protected against shock and breakage caused by detonations in the vicinity and the conduit is strengthened against collapsing.

HOWARD A. STARRET.